United States Patent
Huber, Jr. et al.

(10) Patent No.: US 10,534,971 B2
(45) Date of Patent: Jan. 14, 2020

(54) TAMPER DETECTION FOR IDENTIFICATION DOCUMENTS

(71) Applicant: ID Metrics Group Incorporated, Manchester, NH (US)

(72) Inventors: Richard Austin Huber, Jr., Weehawken, NJ (US); Satya Prakash Mallick, San Diego, CA (US); Matthew William Flagg, San Diego, CA (US); Koustubh Sinhal, Bangalore (IN)

(73) Assignee: ID Metrics Group Incorporated, Manchester, NH (US)

( * ) Notice: Subject to any disclaimer, the term of this patent is extended or adjusted under 35 U.S.C. 154(b) by 169 days.

(21) Appl. No.: 15/783,311

(22) Filed: Oct. 13, 2017

(65) Prior Publication Data
US 2018/0107887 A1    Apr. 19, 2018

Related U.S. Application Data

(60) Provisional application No. 62/408,531, filed on Oct. 14, 2016.

(51) Int. Cl.
*G06K 9/00*  (2006.01)
*G06K 9/20*  (2006.01)
*G06K 9/62*  (2006.01)

(52) U.S. Cl.
CPC ....... *G06K 9/2063* (2013.01); *G06K 9/00449* (2013.01); *G06K 9/6267* (2013.01)

(58) Field of Classification Search
CPC . G06K 9/2063; G06K 9/00449; G06K 9/6267
See application file for complete search history.

(56) References Cited

U.S. PATENT DOCUMENTS

| | | | |
|---|---|---|---|
| 6,636,614 B1* | 10/2003 | Koeppen | G07F 7/08 382/100 |
| 8,855,358 B2 | 10/2014 | Fridrich et al. | |
| 2005/0242568 A1 | 11/2005 | Long et al. | |
| 2010/0052852 A1 | 3/2010 | Mohanty | |
| 2010/0202040 A1* | 8/2010 | Morgan | G02B 26/0841 359/295 |
| 2013/0128056 A1* | 5/2013 | Chuang | H04N 5/2351 348/187 |

OTHER PUBLICATIONS

International Search Report and Written Opinion for International Application No. PCT/US2017/056516, dated Dec. 21, 2017, 12 pages.

* cited by examiner

*Primary Examiner* — Shefali D Goradia
(74) *Attorney, Agent, or Firm* — Fish & Richardson P.C.

(57) ABSTRACT

Methods for detecting digital or physical tampering of an imaged physical credential include the actions of: receiving a digital image representing a physical credential having one or more high value regions, the digital image including an array of pixels; processing the digital image with a tamper detector to generate an output corresponding to an intrinsic characteristic of the digital image, the tamper detector configured to perform a pixel-level analysis of the high value regions of the digital image with respect to a predetermined tampering signature; and determining, based on the output from the tamper detector, whether the digital image has been digitally tampered with.

24 Claims, 13 Drawing Sheets

TAMPER DETECTION FOR IDENTIFICATION DOCUMENTS

CROSS-REFERENCE TO RELATED APPLICATIONS

This application claims the benefit under 35 U.S.C. § 119(e) of U.S. Patent Application No. 62/408,531, entitled "Tamper Detection For Identification Documents," filed Oct. 14, 2016, which is incorporated herein by reference in its entirety.

TECHNICAL FIELD

This specification generally relates to systems and methods for detecting tampered identification documents.

BACKGROUND

The use of physical identification documents has been pervasive in various industries for decades. Moreover, in recent years, digital images of identification documents are increasingly being used for conducting secure, electronic transactions. Current techniques for authenticating imaged identification documents involve systems configured to scrutinize certain security features physically embedded into the underlying document. These security features are, by design, extremely difficult to replicate, and therefore effectively thwart attempts to produce counterfeit copies of the document. Many security features currently in use include intricate print patterns, digital watermarks, micro-printed text, unique emblems or logos, holograms, and the like. Conventional authentication techniques for processing these imaged identification documents is performed by systematically decoding information from a digital watermark and/or employing text or pattern matching techniques to verify the legitimacy of one or more other security features.

SUMMARY

This specification describes technologies for detecting tampered identification documents based on digital images. More specifically, certain embodiments described herein involve techniques for detecting the digital or physical tampering of identification documents based on one or more aspects that are intrinsic to a digital image, and not, for example, associated with extracted text (e.g., text identified by optical character recognition) or other encoded data (e.g., data encoded in security features or machine readable zones). Such aspects include pixel features that evidence physical and/or digital tampering, as well as certain benign pixel features that include, but are not limited to: environmental, capture device, credential wear, lighting effects, hardware/software quantization, and/or digital compression effects. In some examples, these tamper-detection techniques are applied to one or more specific regions of interest—e.g., high value identification regions of the identification documents.

Digital images of identification documents, as discussed in this disclosure, are digital images of physical credentials suitable for use in electronic transactions. The term "electronic transactions" refers broadly to any computer-facilitated exchange between a possessor of a physical or imaged identification document and one or more third parties. Electronic transactions can be conducted in-person or remotely via computer networks. Some electronic transactions may include the exchange of currency, but others may not. Suitable identification documents for conducting secure, electronic transactions may include, but are not limited to, personal identity, employment, or professional credentials or certifications, or other high value identity-assertion documentation—e.g., a driver's license or passport. Further, in some implementations, suitable identification documents may include so-called "breeder documents" (e.g., birth certificates, marriage certificates, social security documents, as well as utility bills, service bills, and other vital data correlation documents). The terms "identification document" and "physical credential" may be used interchangeably throughout this disclosure when referring to any document designed for identity certification, assertion, or authorization that includes identification data. The "identification data" may include one or more of the following: an identification photograph, biographical information (e.g., a date of birth, an identification serial number, a social security number, a physical or electronic mailing address, a height, eye color, and gender), and/or one or more machine readable zones (MRZs) (e.g., a barcode or a Q-code). In some implementations, the identification data may further include other biometric information in addition to the ID photo, such as fingerprints, hand geometry, retina patterns, iris patterns, handwriting patterns, and/or other physical morphological identity characteristics. Regions of the imaged identification document that contain this identification data are referred to generally as "high value regions" throughout the present disclosure because of their importance in identifying the document's possessor in an electronic transaction.

One or more embodiments of the present disclosure are resultant of a realization that conventional techniques for authenticating imaged identification documents are difficult to implement, prone to failure, and/or suffer from severe security vulnerabilities. As one example, authentication techniques reliant upon security features can be difficult to implement on a large scale because they require modifications to the physical identification documents. This amounts to a reissuance of the credential to each possessor. These modifications can take a long time to propagate through a large universe of physical credentials, such as passports and driver's licenses, because users tend to replace them infrequently. Thus, for instance, it could take years to fully implement a digital watermarking system that requires coded data to be embedded in each document. These conventional authentication techniques can also be prone to failure because the decoding and/or text/pattern recognition routines require the identification document to be imaged in very particular lighting conditions and/or alignment orientations. It often takes the user several attempts to achieve a suitable image capture. More importantly, while conventional security features can be effective at inhibiting or preventing successful counterfeiting, they are not helpful in detecting whether an authentically issued physical identification document has been digitally or manually tampered with. For example, the possessor of an authentic identification document may tamper with that document by replacing or altering certain high value regions (e.g., photos, biometrics, biographics, and MRZs) that are critical for identifying the possessor in electronic transactions.

This type of tampering can often be achieved without affecting the embedded security features (e.g., where the security features do not overlay the high value regions of the identification document), and thus will not be detected by conventional authentication techniques, which allows the document possessor to hide or outright replace critical information in order to conceal his/her identity. Moreover, it is relatively simple to manipulate non-security feature aspects of the identification document, including the high value regions, using commercially available image editing software. Of course, attempts at tampering with identification documents tend to vary in type and level of sophistication. At the lower sophistication levels, entire regions of the identification document may be altered or replaced (digitally or physical) without making any attempts to match texture or font. Other attempts may be more refined. For example, the forger may utilize special software in an attempt to meticulously recreate backgrounds, security features, and the like. As yet another example, the forger may attempt to homogenize the modified portions of the image by taking a new live photo of a printout or screenshot of the splice or tamper. These and a myriad of other tamper techniques can be used to effectively undermine conventional authentication methods.

Accordingly, embodiments of the present disclosure aim to resolve these and other problems with conventional authentication techniques by providing a fundamental paradigm shift in the field that does not rely solely on security features to verify the legitimacy of imaged identification documents. In particular, the present disclosure relates to techniques for validating the intrinsic image characteristics within and around certain high value regions of the imaged identification document. As will be evident in view of the following discussion, the unconventional techniques of this disclosure are somewhat agnostic to security features insofar as these features are not scrutinized based on predetermined patterns or encoded data. Further, it is understood that in certain types of identification documents, the embedded security features may partially or entirely overlay the high value regions of interest. In cases where no such overlay exists, the techniques described herein may serve as the only assurance of document integrity. In overlay cases, the presently described techniques provide additional value to those security features by ensuring that they are native to the document and not forged over the modified high value region(s) or lifted from another document of the exact same type.

In general, one innovative aspect of the subject matter described in this specification can be embodied in methods that include the actions of: receiving a digital image representing a physical credential having one or more high value regions, the digital image including an array of pixels; processing the digital image with a tamper detector to generate an output corresponding to an intrinsic characteristic of the digital image, the tamper detector configured to perform a pixel-level analysis of the high value regions of the digital image with respect to a predetermined tampering signature; and determining, based on the output from the tamper detector, whether the digital image has been digitally tampered with.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Further, in some examples, the pixel-level analysis includes examination of a combination of multiple intrinsic pixel features. In some examples, the combination of intrinsic pixel features includes: one or more pixel features that evidence physical and/or digital tampering; and one or more benign pixel features including: environmental, capture device, credential wear, lighting effects, hardware/software quantization, and/or digital compression effects.

In some examples, a high value region of the received digital image includes biographical text, and the predetermined tampering signature of the tamper detector includes biographics splicing or other modification. In some examples, a high value region of the received digital image includes biometric data, and the predetermined tampering signature of the tamper detector includes photo splicing or other modification. In some examples, the biometric data includes an identification photograph. In some examples, a high value region of the received digital image includes a machine readable zone (MRZ), and the predetermined tampering signature of the tamper detector includes MRZ splicing or other modification. In some examples, the predetermined tampering signature of the tamper detector includes image blurring or occlusion of one or more of the high value regions.

In some examples, the tamper detector includes a predictive model trained by a machine learning algorithm applying a training dataset. In some examples, the training dataset includes: a first set of untampered digital images; and a second set of digital images including digitally tampered derivations of one or more of the untampered digital images. Each of the untampered digital images of the first set are assigned a first common label in the training dataset, and each of the tampered digital images of the second set are assigned a second common label in the training dataset, the second label differing from the first.

In some examples, the first set of untampered digital images is selected to induce examination of a combination of multiple intrinsic pixel features. In some examples, the combination of intrinsic pixel features includes: one or more pixel features that evidence physical and/or digital tampering; and one or more benign pixel features including: environmental, capture device, credential wear, lighting effects, hardware/software quantization, and/or digital compression effects. In some examples, the first set of untampered digital images includes a plurality of images representing different forms of personal identity credentials. In some examples, the different forms of personal identity credentials include different densities of security features. In some examples, the different forms of personal identity credentials include different layout designs. In some examples, the first set of untampered digital images includes a plurality of images captured under different lighting conditions. In some examples, the first set of untampered digital images includes a plurality of images captured with different imaging devices. In some examples, the first set of untampered digital images includes a series of digital images representing the same physical credential, each digital image of the series oriented at a different degree of rotation. In some examples, the first set of untampered digital images includes a plurality of randomly rescaled images. In some examples, the first set of untampered digital images includes a plurality of images including randomly introduced digital noise. In some examples, the second set of digitally tampered images are derived by automatically modifying one or more portions of the pixel array of each untampered image of the first set, the modification determined based on the tampering signature of the tamper detector. In some examples, the second set of tampered images are derived from manually modifying physical credentials with physical tampering methods followed by digitally imaging a physically modified credential. In some examples, the second set of physically modified tampered images are further modified at the pixel level with digital editing tools to mask the physical tamper. In some examples, the second set of tampered images are derived from manually or automatically produced physical or tampers upon physical credentials with physical use characteristics being visually evident. In some examples, the visually evidence use characteristics include wear, damage, design flaws, or deliberate physical modification. In some examples, the second set of tampered images are derived from original uncorrected images with lighting, angle to the focal plane, skew, rotation, blur inherent from the original digital imaging event. In some examples, the second set of tampered images are derived from enhanced corrected images which are angled to match the document print orientation, either vertical or horizontal and oriented to 0 or 90 degrees on an edge, skew corrected to proper aspect ratio, blur and lighting and other effects corrected and enhanced before tamper.

In some examples, a plurality of digital images of the training dataset include a pixel array having a modified principal component. In some examples, the predictive model includes a probabilistic classifier, and the output includes a classification of the digital image and a degree of certainty. In some examples, determining whether the digital image has been tampered with includes comparing the degree of certainty to a predetermined threshold value.

In some examples, the predictive model includes a convolutional neural network classifier having a multi-layer node-based architecture, the output layer of the classifier including a multi-class data layer.

In some examples, analyzing the pixel array includes the actions of: identifying a region of interest as a subset of the pixel array; and implementing a tamper detection algorithm with respect to only the identified region of interest tuned and trained for that region of interest. In some examples, analyzing the pixel array includes the actions of: identifying a region of interest as a subset of the pixel array; and implementing multiple tamper detectors based on different tampering signatures with respect to the identified region of interest. In some examples, determining whether a digital image has been tampered with includes applying multiple independent thresholds to respective outputs from the multiple tamper detectors. In some examples, analyzing the pixel array includes the actions of: identifying multiple regions of interest as subsets of the pixel array; and implementing a unique combination of one or more different tamper detection algorithms with respect to each of the regions of interest. In some examples, determining whether a digital image has been tampered with includes the actions of: for each region of interest, applying multiple independent thresholds to respective tamper outputs from the one or more tamper detectors to determine multiple tamper probabilities; for each region of interest, aggregating the multiple tamper probabilities to determine a region-level tamper probability, and aggregating the region-level tamper probabilities of the multiple regions to determine a document-level probability of tamper.

In some examples, the physical credential represented by the received digital image includes one or more physically embedded security features, and the tamper detector is further configured to perform the pixel-level analysis agnostic of the security features embedded in the represented physical credential.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a diagram of an example system for providing output indicating whether an imaged identification document has been tampered with.

FIG. 9 is a flowchart of an example process for providing output indicating whether an imaged identification document has been tampered with.

Like reference numbers and designations in the various drawings may indicate like elements.

DETAILED DESCRIPTION

Figure 1:
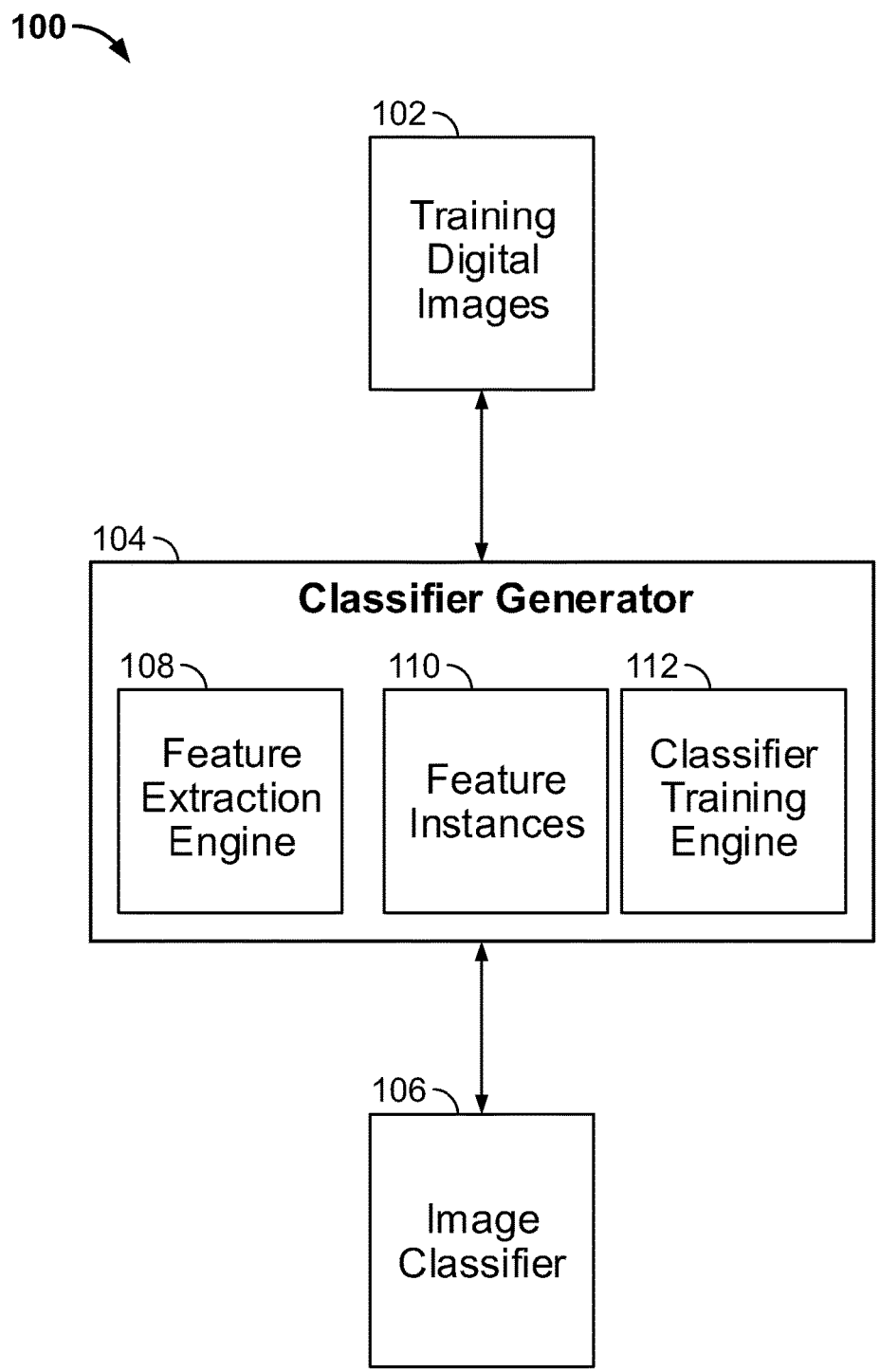
FIG. 1 is a diagram of an example system for generating an image classifier.

One or more embodiments of the present disclosure involve systems and methods for detecting tampered identification documents that have been imaged for conducting electronic transactions. In particular, certain embodiments may include processing a digital image of a physical identification document with a tamper detector to generate an output corresponding to an intrinsic characteristic of the digital image. The tamper detector may perform a pixel-level analysis of the digital image with respect to a predetermined digital and/or physical tampering signature. The term "pixel-level analysis" refers to the computer-implemented examination of individual pixels, or small groups of pixels, in a digital image. For instance, the pixel-level analysis may examine certain pixel features that evidence physical and/or digital tampering, as well as certain benign pixel features that include, but are not limited to: environmental, capture device, credential wear, lighting effects, hardware/software quantization, and/or digital compression effects. These aspects are discussed in detail below. The term "tampering signature" refers to the specific type(s) of digital or physical tampering that the tamper detector is configured to detect—e.g., image splicing, MRZ splicing, biographics splicing, and/or blurring/occlusion. In some examples, the tamper detector is configured to perform the pixel-level analysis substantially agnostic of the specific security features embedded in the represented physical credential. That is, while the tamper detector may examine pixels of the image that represent the security features (e.g., when the security features overlay certain high value regions of the identification document), it may not implement any specific decoding or pattern matching routines to verify them.

In some embodiments, the tamper detector includes a trained image classifier. Image classifiers are generally used to classify images according to predefined labels. An image classifier may identify a predefined label that matches or partially matches an image, and then associate the identified label with the image. For example, an image of a cat sitting on a chair may be labeled "cat," "chair," or both. In some image classifiers, an image may be labeled according to broad categories of image content, e.g., animal or human. In other image classifiers, an image may be labeled according to narrow categories, e.g., Persian cats or Bengal cats. Certain embodiments of the present disclosure involve the construction of an image classifier specifically configured to determine whether the high value regions of an identification document have been tampered with. For example, the image classifier may label the image of the identification documented as "tampered" or "untampered" based on a number of intrinsic features obtained from a pixel-level analysis of the digital imaged identification document. The image classifier can be trained based on one or more features extracted from a collection of training images. The training images are representative examples of various imaged identification documents that are either tampered or untampered, and labeled as such. As discussed throughout this disclosure, the selection/creation and labeling of training images is specifically designed to optimize and/or reinforce certain weights in the classifier architecture based on one or more aspects of the intrinsic features in these images with respect to the high value regions data included in the underlying identification documents.

In some examples, a machine learning system may be used to process training data and construct suitable image classifiers for enabling the techniques described herein. These machine learning systems may receive and process a myriad of unique training examples, each of which embodies a distinct combination of intrinsic features that are separate and apart from the security features embedded within the physical credential. When developing an image classifier, various architectures may be used, including, for example, a neural network. In certain implementations described herein, a Convolutional Neural Network ("CNN") or Deep Convolutional Neural Network ("DCNN") may be used.

FIG. 1 is a diagram of an example system 100 for generating an image classifier 106. The image classifier 106 may be appropriately configured to distinguish between tampered and untampered digital images of physical credentials based on intrinsic features associated with certain high value regions of identification data. As shown, the system 100 includes a classifier generator 104 that receives a collection of training images 102. The classifier generator 104 utilizes the training images 102 to generate an image classifier 106. The collection of training images 102 includes a group of positive digital images labeled as "tampered" and a group of negative digital images labeled as "untampered". The positive and negative (tampered and untampered) digital images can be labeled manually by human users, or automatically by a training data generation system. Specific techniques for developing the collection of training images 102 are described in greater detail below with respect to FIGS. 6A-7F.

In this example, the classifier generator 104 includes a feature extraction engine 108, feature instances 110, and a classifier training engine 112. The feature extraction engine 108 extracts intrinsic features (e.g., intrinsic pixel features) from the received training images 102. In some examples, the feature extraction engine 108 may include a CNN (e.g., a pre-trained CNN generated from a large collection of diverse images). A number of different types of features are extracted as indicative of a digital image of physical credential. For example, the extracted features can include textual information, edges of photos, patterns of photos, etc. The extracted features from each digital image in the received training images 102 form a collection of feature instances 110. These extracted features are used by the classifier training engine 112 to train an image classifier. Not all features need be provided to the classifier training engine 112. Instead, different combinations of features can be used depending on the particular classifier application—e.g., the intended tampering signature of the trained image classifier 106.

In some examples, extracted intrinsic pixel features may include one or more aspects relating to image capture lighting. Lighting aspects may include imaging effects from different configurations of light sources (multiple or single), light color/wavelength responses, angles of incidence, etc. In some examples, extracted pixel features may include one or more aspects relating to selected image capture devices. Aspects relating to the image capture devices may include effects (e.g., pixilation/resolution, noise, manufacturing defects) from using different types of image sensors (e.g., charge-coupled devices (CCD), complementary metal-oxide-semiconductor (CMOS), or N-type metal-oxide-semiconductor (NMOS)). In some examples, extracted pixel features may include one or more aspects relating to optical lensing. Optical lensing aspects may include effects such as fixed/variable focal length, fisheye, as well as other optical lensing distortions (e.g., lens damage/dirt). In some examples, extracted pixel features may include one or more aspects relating to certain imaging environments. Imaging environment aspects may include color/intensity/hue response by different image sensors across varying backgrounds and/or foregrounds. Imaging environment aspects may also include multiple/single focal points/planes with physical/digital estimation, bisection of the target focal plane, and effects of foreground/background in the focal plane. In some examples, extracted pixel features may include one or more aspects relating to hardware and/or software quantization. Quantization aspects may include imaging effects produced by colorspace rendering in quantized space from continuous physical space, quantization and estimation by various imaging libraries, as well as further quantization/compression by compressed image formats. In some examples, extracted pixel features may include one or more aspects relating to automatic software-implemented post-imaging enhancements, such as: color balancing, image enhancement, histogram equalization, multiple colorspace/response, etc. In some examples, extracted pixel features may include one or more aspects relating to manual post-imaging modifications, such as: filters, transforms, and the like.

Figure 10A:
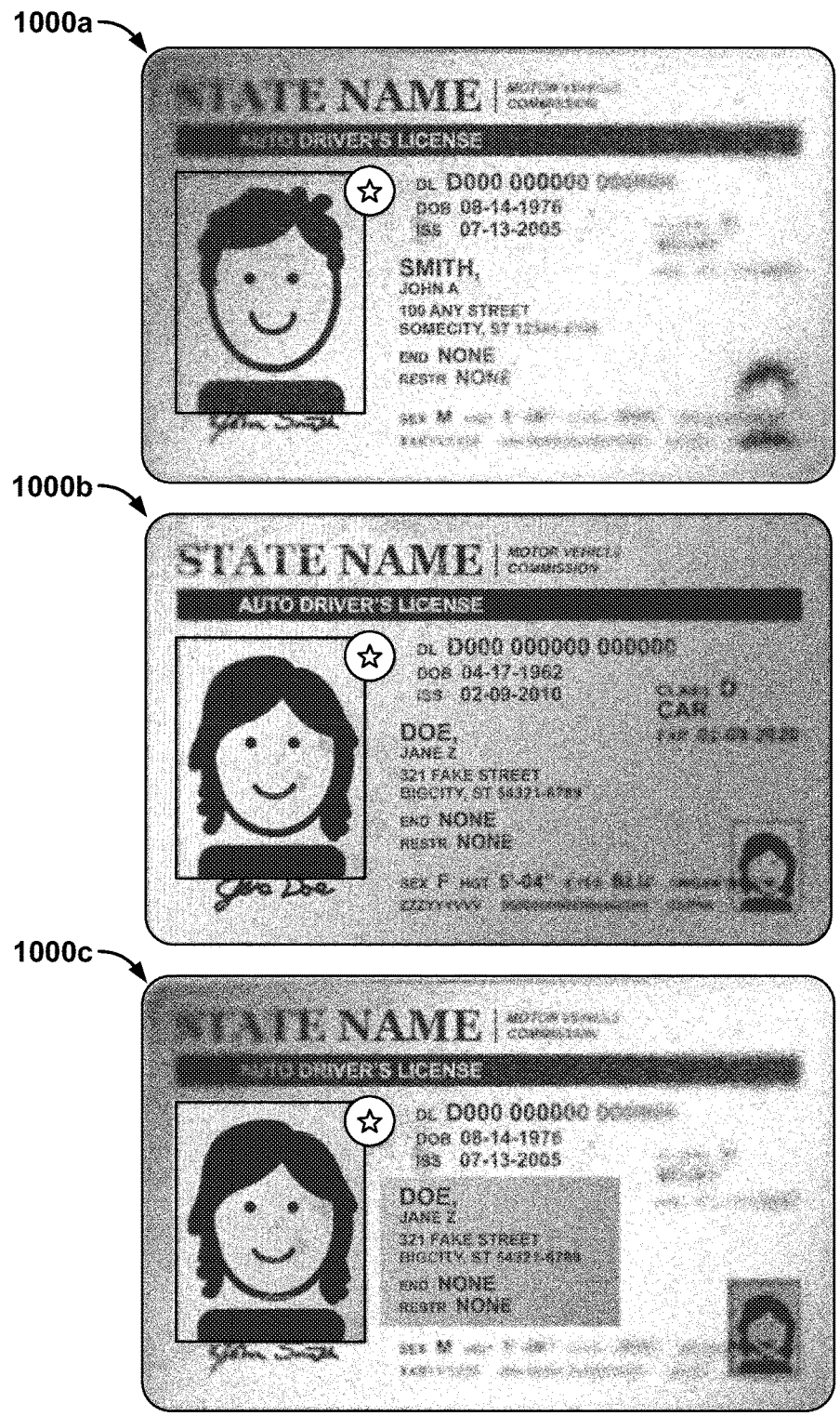
FIG. 10A is a diagram comparing tampered and untampered identification documents represented by digital images.
Figure 10B:
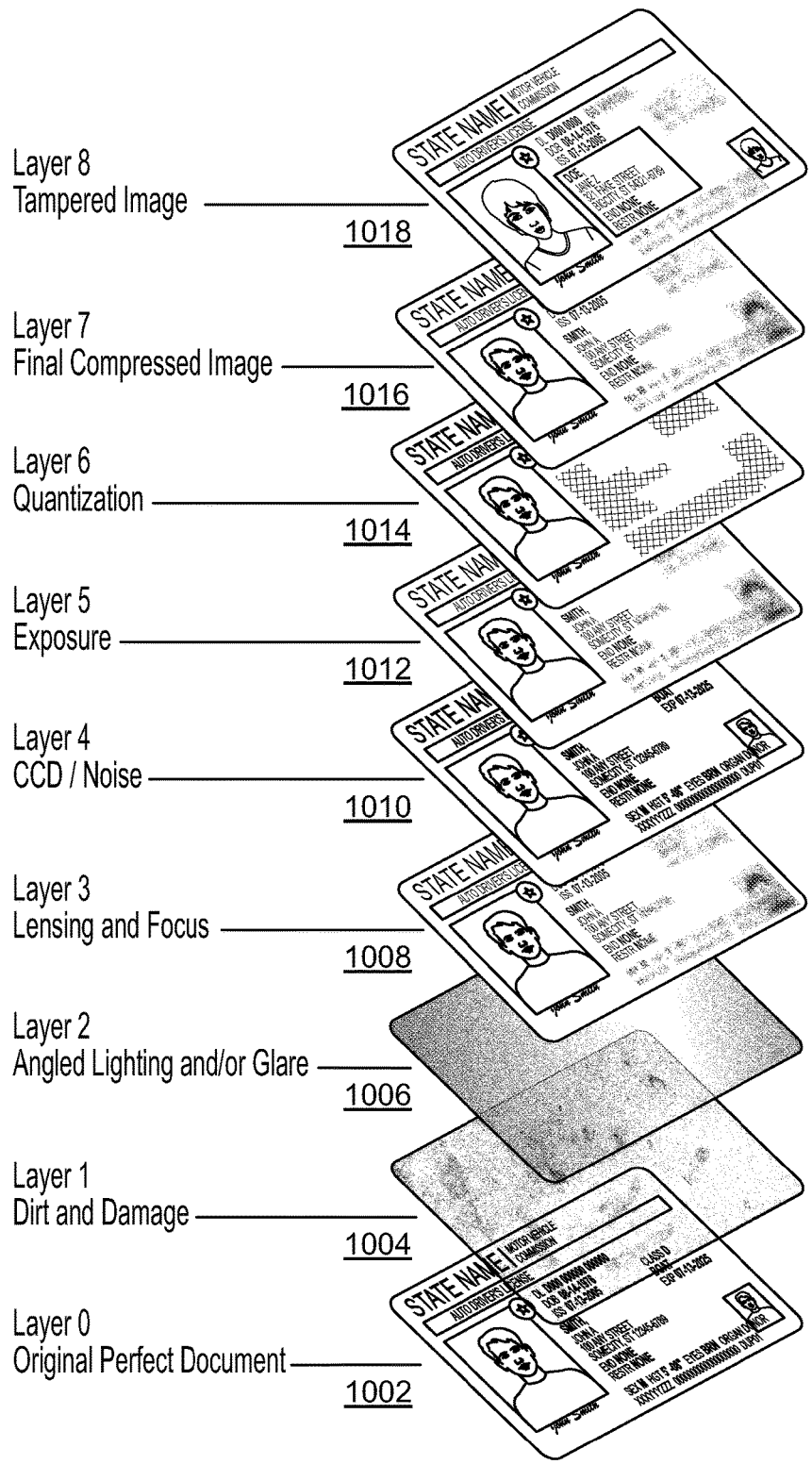
FIG. 10B is a diagram illustrating various intrinsic layers of a digitally imaged identification document.

Various aspects relating to extracted intrinsic pixel features are further exemplified by a discussion of FIGS. 10A and 10B. FIG. 10A provides a comparison of three images—a first untampered image 1000a of a first driver's license, a second untampered image 1000b of a second driver's license, and a third image 1000c that has been tampered by replacing or "splicing" the photo and biographic regions of the first image 1000a with the corresponding regions of the second image 1000b. FIG. 10B provides a layered illustration of the third image 1000c.

In the example of FIG. 10B, "Layer Zero" (1002) represents the original perfect document as produced by the original manufacturer. This layer includes the underlying identification document, with all the visible light security features, high value regions (biometrics, biographics, MRZs, etc.) as if it was perfectly imaged. "Layer One" (1004) represents the dirt and damage that can accumulate over time. This may include, for example, laminate quality, use, wear and tear, etc. This layer may also represent the laminate or outer surface of the credential itself, including reflectivity (e.g., degree of gloss or perforation) and damage (e.g., wear and tear, rubbing, cracking, color fade from sun exposure or dirt). This layer may also represent deliberate physical modification of the credential including cutting, perforation, or the affixing of stickers or other post manufacturing materials to the surface (e.g., change of address stickers, perforation by an agency due to expiration and replacement, and deliberate physical tampering to misrepresent data). In general, this layer corresponds to one or more physical aspects of the underlying document.

"Layer Two" (1006) represents the effects of lighting and environment during the image capture event. Lighting effects may relate to the number of light sources, the degree of light intensity and angle (e.g., lighter towards the light source, darker further away), the presence of an optically variable device ("OVD"), such as a color changing security feature/hologram, the degree of light color/hue/intensity, etc. Environment effects may relate to contrast between the imaged document and the background, as well as other similar aspects. "Layer Three" (1008) represents lensing effects and focal length. For example, fisheye may occur when the document is too close to the lens or positioned at angle relative to the lens. These imperfections in orientation at the time of image capture may also cause problems with respect to the focal length, resulting in portions of the document that are further or closer to the lens to become partially blurry. In general, this layer corresponds to areas that may be in or out of focus based on the conditions of image capture. "Layer Four" (1010) represents effects relating to exposure, such as color/lighting response of the CCD, shutter speed (e.g., exposure duration), and the like. In general, this layer corresponds to areas that may appear "washed out" do to exposure imperfections during image capture. "Layer Five" (1012) represents effects relating to the CCD (or other imaging sensors)—the manufacturing quality, for example. Low quality imaging sensors tend to cause portions of the image to appear cloudy, noisy, washed out, or otherwise defective. This layer may also capture differences in scan and refresh rates between computer screens and imaging sensors resulting in pixelization and moiré colorspace effects from wavelength harmonics. In general, this layer corresponds to overall uniformity in defects typically caused by imperfect imaging sensors and the physical wavelength harmonics between sensors and screens.

"Layer Six" (1014) represents effects relating to hardware and/or software quantization. As will be appreciated by those of skill in the art, the purpose of quantization is to effectively transform aspects of the real world (e.g., colors, shadows, lights, etc.) into pixels. FIG. 10B provides an example of the quantization effect in the image of "Layer Six" (1014) where there is a significant difference pixilation between the left and right side of the image. In general, this layer corresponds to the wide range of pixilation that may occur at the time of image capture. "Layer Seven" (1016) represents effects from software image enhancement and compression. These aspects typically relate to re-quantizing to the available color palette and depth (e.g., 8 bit or 24 bit color). Enhancements may also include histogram equalization, and other filters and effects to boost dark areas and soften lighter ones. Enhancement may be followed by compression, which can again re-quantize to save space, reducing pixel count, reducing depth, etc. In general, this layer accounts for groups of pixels that are indicative of higher pixilation levels from post-capture processing.

The seven layers described above represent exemplary intrinsic pixel features that may be perceived by image classifiers (as well as other types of tamper detectors) and identified as associated with natural or untampered imaged identification documents. That is, the intrinsic features described above tend to be induced by routine and conventional image capture and processing operations, and are therefore benign. On the other hand, "Layer Eight" (1018) represents aspects of a tampered image (i.e., image 1000c of FIG. 10A) that can be distinguished from other the benign intrinsic features of the prior seven layers. Intrinsic features specific to this eighth layer are associated with identification documents that have been physically or digitally tampered with. Various embodiments of the present disclosure are directed to techniques for training and applying image classifiers configured to identify and distinguish between intrinsic pixel features that are benign and those that evidence a tampering attack.

Referring back to FIG. 1, any suitable type of image classifier can be trained and used to classify digital images of physical credentials. For example, the image classifier 106 may be a CNN, a support vector machine, or a Bayesian classifier. In any event, training the image classifier 106 by the classifier training engine 112 involves a machine learning process that learns respective weights to apply to each input feature. Typically, an image classifier is trained using an iterative process that progressively develops weights for each of the input features. That is, the image classifier may include default or initial weights assigned to each feature that are iteratively amended as the process attempts to find optimal weights. Based on the learned feature weights, an input digital image of a physical credential can be scored by the generated image classifier 106. In some implementations, each input digital image of a physical credential is scored by the image classifier 106 as a probability of being tampered on a scale from 0.0-1.0. In some implementations, the output classifier score for each digital image of a physical credential is compared to a threshold probability value to determine whether an imaged physical credential has been tampered with (digitally or physically) or is untampered. In some examples, scores from multiple image classifiers can be combined to produce an aggregate score, or the respective scores of each classifier may be evaluated individually in series.

In some implementations, after training, the image classifier 106 can be evaluated using an obtained group of sample images. The sample images are distinct from the training images and have known tampered/untampered labels. Similar to the training images 102, the group of sample images may include both positive/tampered digital images and negative/untampered digital images. Each digital image of the group of sample images are scored by the image classifier 106. As noted above, the score indicates a likelihood that the digital image of the physical credential is tampered or untampered. The scores are compared to the known labels to evaluate the accuracy of the image classifier 106. If the output of the image classifier 106 does not substantially match the known labels, the classifier 106 can be adjusted or trained on a new set of training images. Further, in some examples, differences between the output of the image classifier 106 and the known labels during the test phase may affect the scoring thresholds used to label classification results (e.g., specific operational thresholds can be chosen corresponding to the score response of a given set of data).

Figure 2:
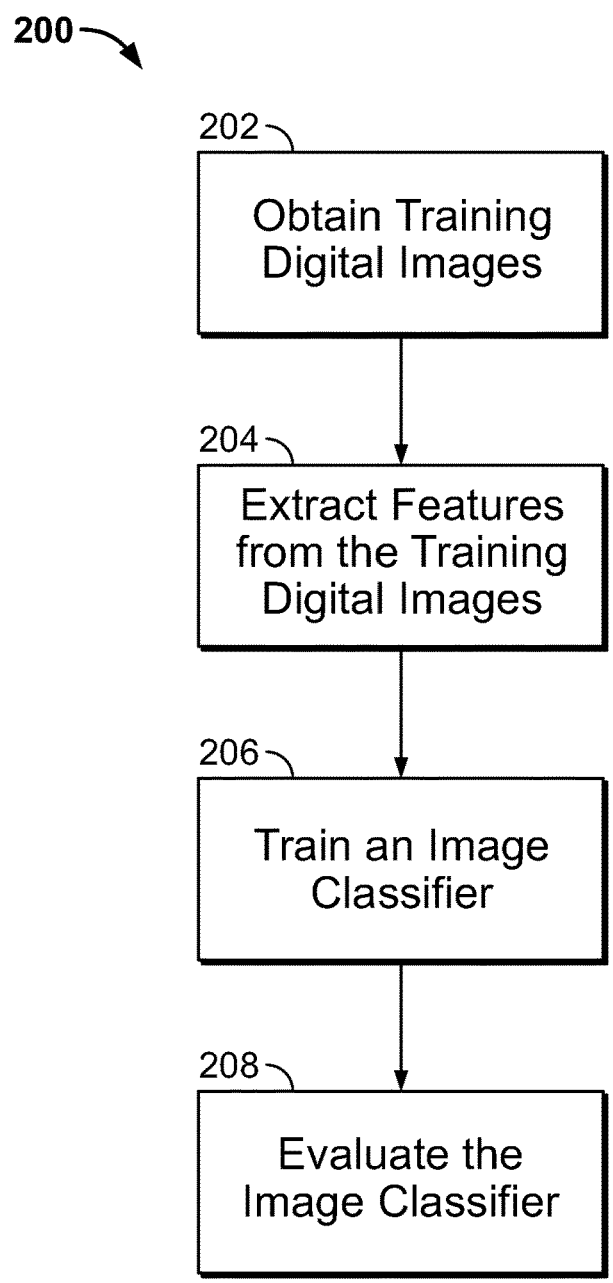
FIG. 2 is a flowchart of an example process for training an image classifier.

FIG. 2 is a flowchart of an example process 200 for training an image classifier. The process 200, and all other processes described herein, can be performed by a system of one or more computers, located in one or more locations, programmed in accordance with one or more embodiments of this disclosure. For example, the classifier generator 104 of FIG. 1 can perform the process 200.

According to process 200, the system obtains a collection of training images (202). The collection of training images can be generated by the system or obtained from another source. The training images (e.g., training images 102) include positive examples of digital images that are labeled as tampered and negative examples of digital images that are labeled as untampered or natural. The system extracts features from the training images (204). As described above, a feature extractor (e.g., the feature extractor engine 108) can extract one or more intrinsic pixel features from the received training images. The system uses the extracted feature instances to train an image classifier having the extracted features as variables (206). The training of the image classifier assigns optimum weights to the respective features that maximize the likelihood of correctly labeling an input digital image as tampered or untampered. The system evaluates the image classifier (208). In particular, the image classifier is applied to a group of known sample images. The output of the image classifier is compared to the known labels of the digital images. As a result, the image classifier can be validated. The image classifier can then be applied to a larger collection of digital images and can be used for detecting an imaged physical credential that has been tampered with.

Figure 3:
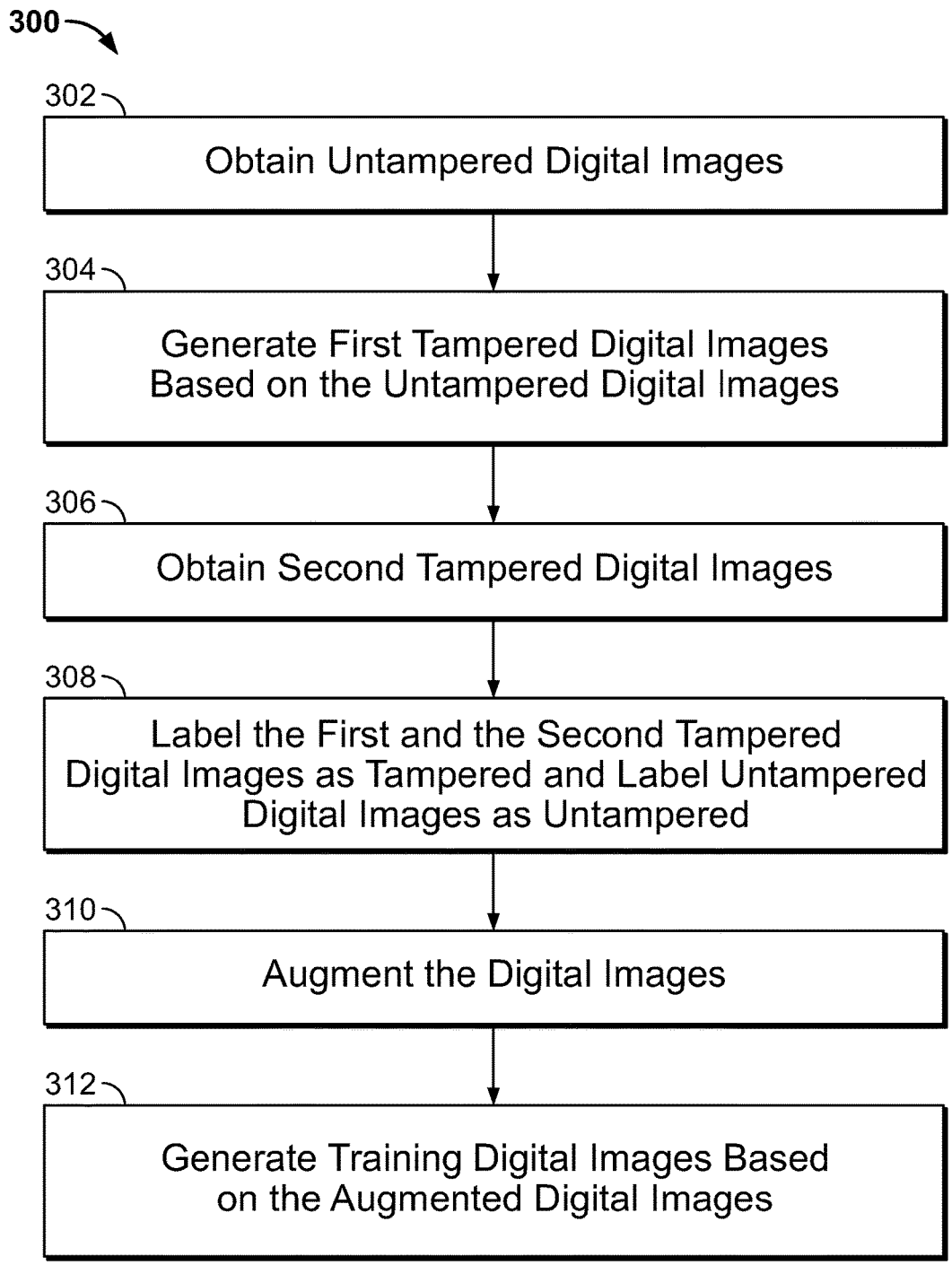
FIG. 3 is a flowchart of an example process for generating training images.

FIG. 3 is a flowchart of an example process 300 for generating a collection of training images that can be used to train an image classifier (e.g., step 202 of process 200). According to the process 300, the system obtains untampered digital images of physical credentials (302). The untampered digital images of physical credentials are digital images that are not edited, spliced, or otherwise intentionally tampered with (note, however, that untampered images can be modified to mimic different lighting conditions, environmental effects, etc.). More specifically, the collection of untampered images is specifically selected to induce the identification, extraction, and weight optimization of certain intrinsic pixel features. For example, the selected intrinsic pixel features may relate to various aspects of digital images produced by commercial off the shelf (COT) imaging devices. Thus, as discussed above, the untampered images may be selected to achieve inspection of a combination of intrinsic features including one or more of: image capture lighting, image capture devices, optical lensing, imaging environments, hardware and/or software quantization, or automatic or manual post imaging enhancements. Various embodiments of the present disclosure are derivative of a realization that selected combinations of such intrinsic features comprise a unique "fingerprint" of a digital image. Indeed, it has been discovered that training a classifier to identify and scrutinize the fingerprint of each imaged identification document with respect to certain high value regions produces surprisingly accurate results in tamper detection.

In some examples, suitable untampered images may include digital images of driver's licenses for various states in the United States and foreign countries, digital images of passports for various countries, or digital images of government identifications for various government departments and agencies can be untampered digital images of physical credentials. In addition, the untampered digital images include digital images of various versions of a particular physical credential. For instance, digital images of California driver's licenses issued in 1990s, 2000s, and 2010s can be untampered digital images. Moreover, the untampered digital images of physical credentials may include digital images of a particular physical credential that are obtained under various circumstances. For instance, digital images of a particular driver's license that are taken under various lighting conditions or using various image capture devices (e.g., point-and-shoot cameras, cell phone cameras, etc.). Example factors that affect different lighting conditions include color, temperature, light intensity, and a direction of incoming light. In some examples, the untampered digital images may present visually evidence physical use characteristics, such as wear, damage, design flaws, or deliberate physical modification. Further, in some examples, the untampered digital images may be "uncorrected" with relative to the original imaging event. Thus, the untampered images may include flaws with respect to lighting, angle to the focal plane, skew, rotation, and blur. In some other examples, the untampered images may be automatically processed by the system to correct such flaws. Of course, numerous other operations for providing a suitable collection of untampered images to induce examination of certain intrinsic pixel features are also contemplated within the scope of this disclosure.

Still referring to FIG. 3, the system generates a first set of tampered images based on the untampered digital images (304). In some implementations, the first set of tampered digital images can be generated manually by a human user or automatically by the system. For example, the first set of tampered digital images may be generated by: (i) replacing an original photo in a digital image of a physical credential with a different photo ("photo splicing"), (ii) replacing original biographic information in a digital image of a physical credential with different biographic information ("biographics splicing"), (iii) replacing an original MRZ in a digital image of a physical credential with a different MRZ ("MRZ splicing"), and/or (iv) occluding or blurring a photo, biographics, or the MRZ in a digital image of a physical credential. Examples of generating the first set of tampered digital images of physical credentials based on the untampered digital images of physical credentials are described below with respect to FIGS. 6A-7F.

The system may optionally obtain a second set of tampered images of physical credentials (306). The system can obtain the second set of tampered images from sources other than the original untampered images (e.g., a repository of tampered images). For example, the second set of tampered images may include images (or variations thereof) that were mislabeled during testing or live use of the system. In any event, the system labels the first and (optionally) second sets of tampered images as "tampered" (308). In addition, the system labels the untampered digital images of physical credentials as "untampered" (308). The system may also augment the first and second sets of tampered images, as well as the untampered images (310). The augmentation of the digital images advantageously increases and further diversifies the collection of training images, which improves the performance level of the image classifier. In some examples, the system can augment the entire digital image, or just a particular portion of a digital image. In addition, the system can apply different augmentation techniques on different portions of a digital image.

The system can use various techniques for augmentation of the untampered/tampered digital images. In some implementations, the system can augment digital images by resizing the digital images. For example, the system can enlarge or shrink a size of a digital image. In some implementations, the system can augment digital images by rotating the digital images. For example, the system can rotate digital images by 90, 180, or 270 degrees (of course, other degrees of rotation may also be used—e.g., 5, 120, and 260 degrees). In some implementations, the system can augment digital images by adding noise, e.g., random Gaussian Noise, to the digital images. In some implementations, the system can augment digital images by changing photometric features. For example, the system can change colors in a digital image. Further still, in some implementations, the system can augment digital images via re-quantization into different color depths and image channel architectures (1-channel, 3-channel, 4-channel etc.), compression using varied image compression formats, and/or a variety of other filtering effects.

The system then generates a collection of training images based on the augmented digital images (312). The training images generated by the system include two groups of digital images; one group of digital images is labeled as tampered and another group of digital images is labeled as untampered. The training images can be provided to a classifier generator, e.g., the classifier generator 104 of FIG. 1, for training an image classifier.

Figure 4:
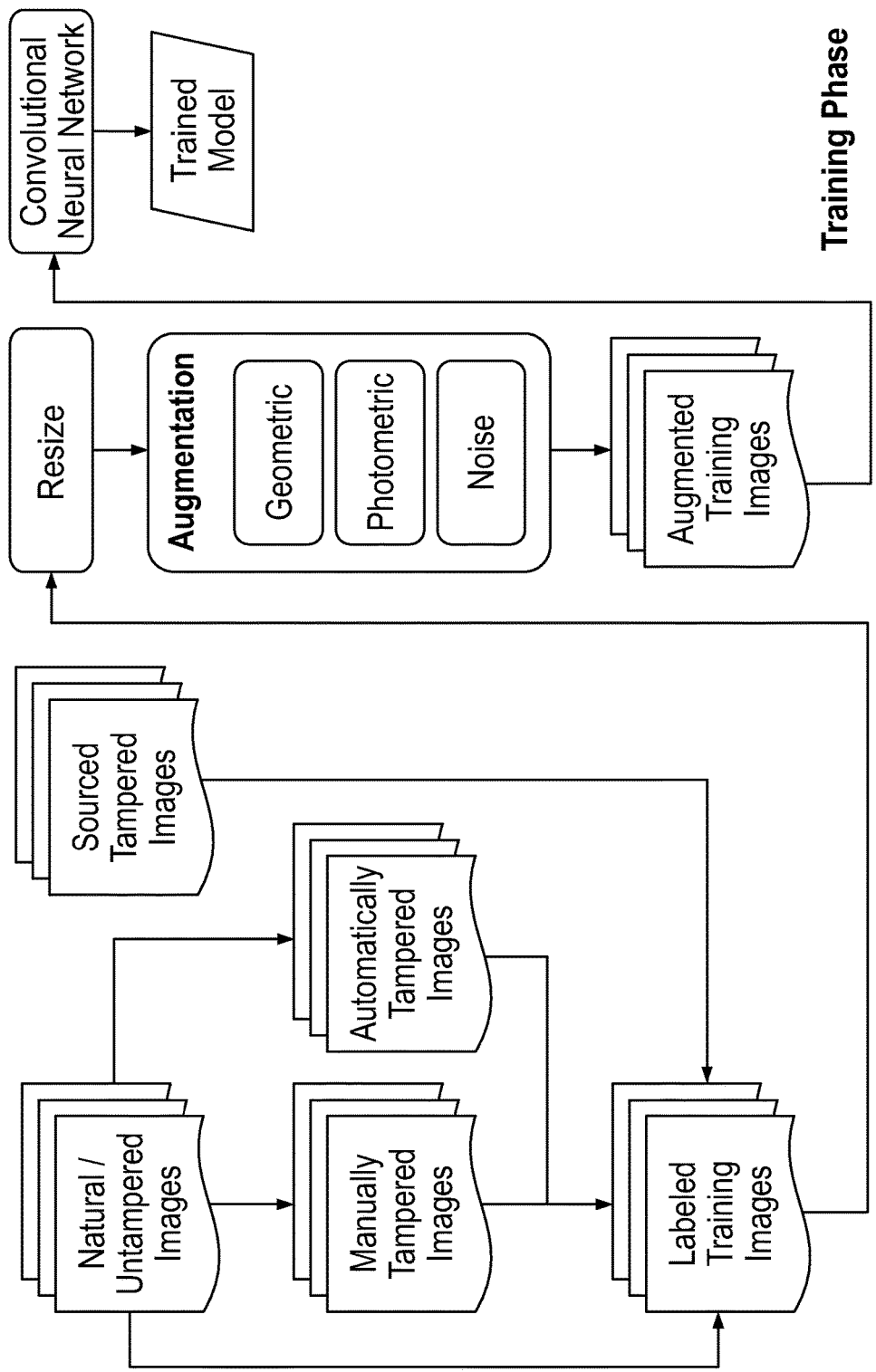
FIG. 4 is a process diagram illustrating a training phase for generating an image classifier.
Figure 5:
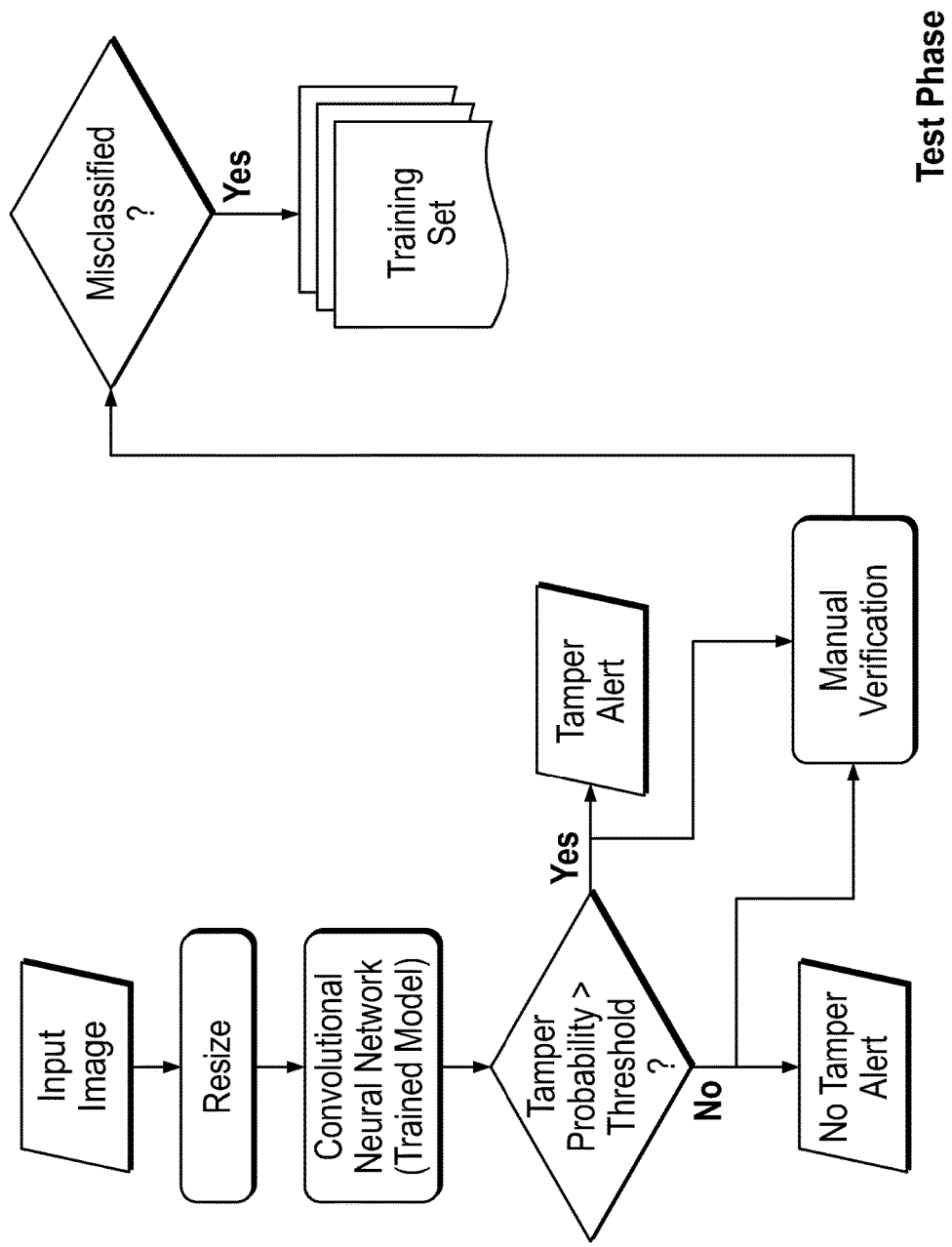
FIG. 5 is a process diagram illustrating a test phase for evaluating an image classifier.
Figure 6A:
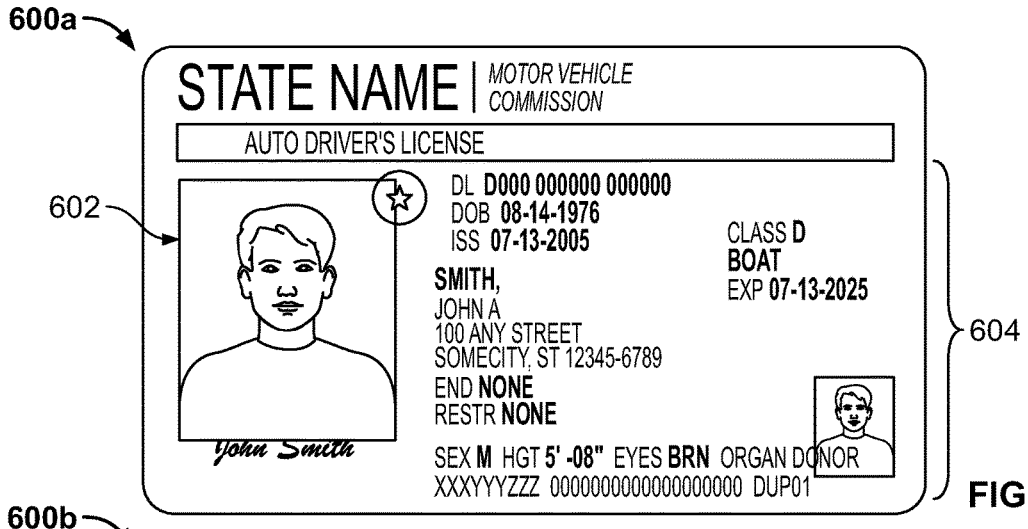
FIGS. 6A-6F are illustrative diagrams of natural and tampered digital images of a state driver's license.
Figure 6B:
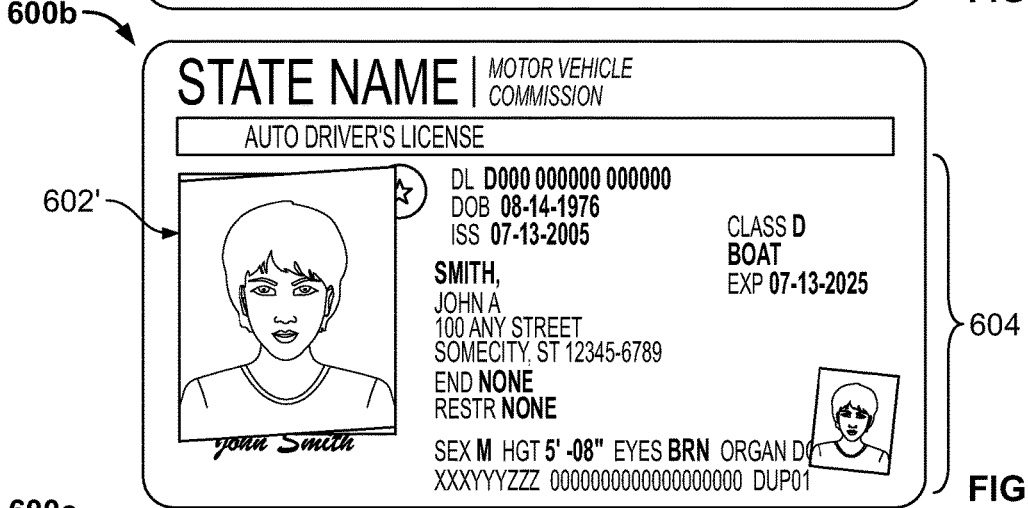
Figure 6C:
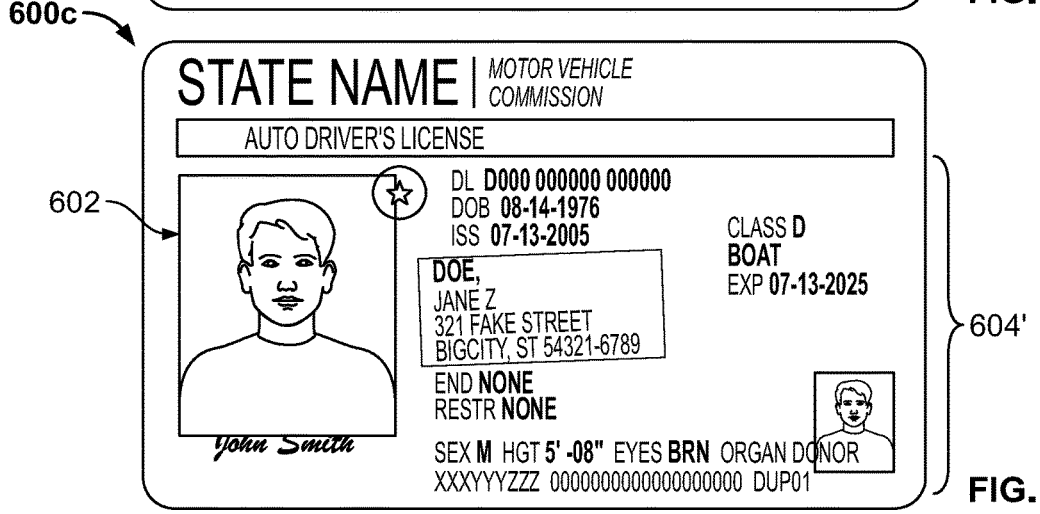
Figure 6D:
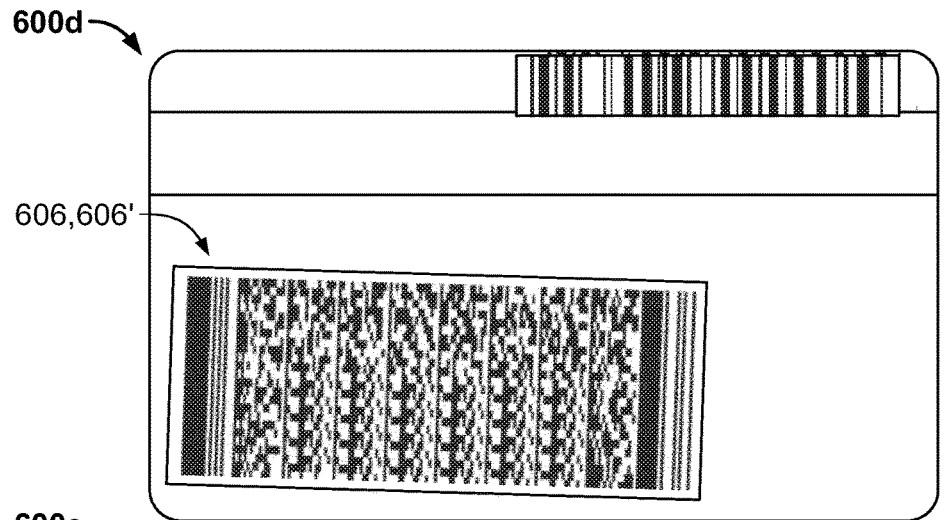
Figure 6E:
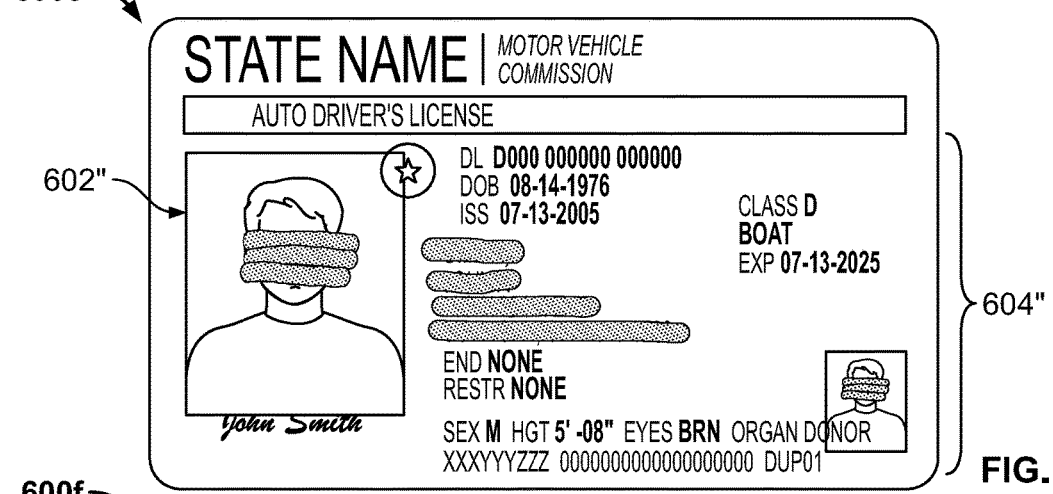
Figure 6F:
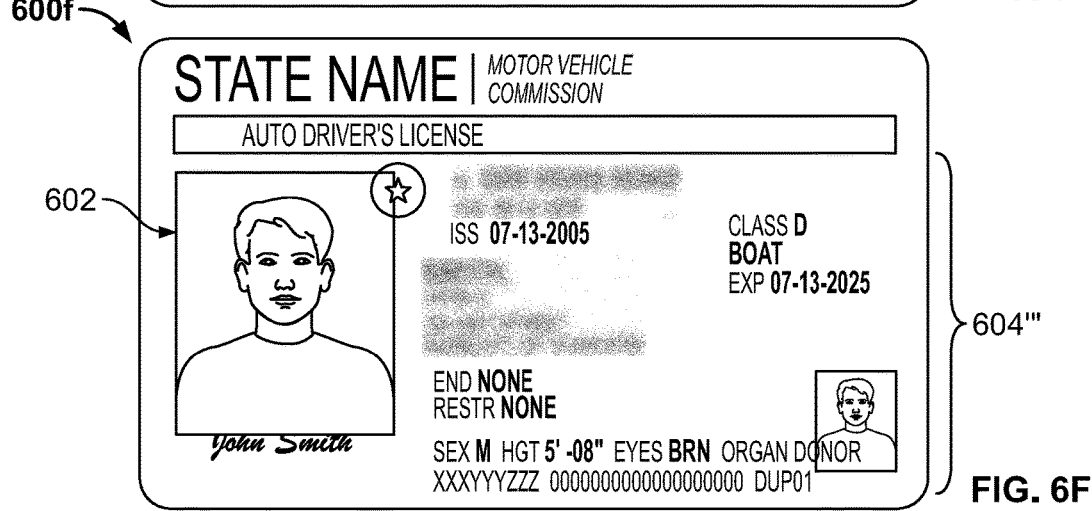
Figure 7A:
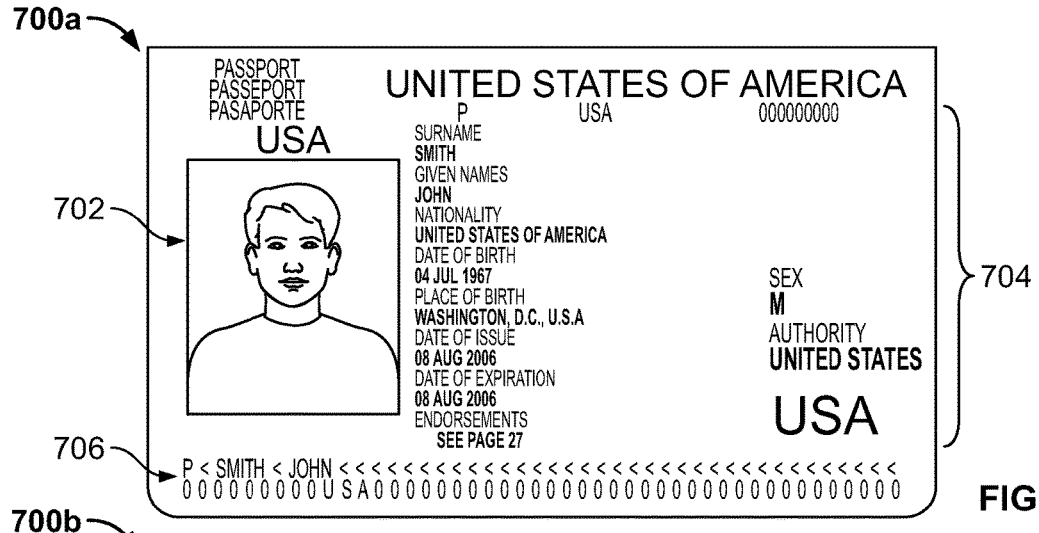
FIGS. 7A-7F are illustrative diagrams of natural and tampered digital images of a national passport.
Figure 7B:
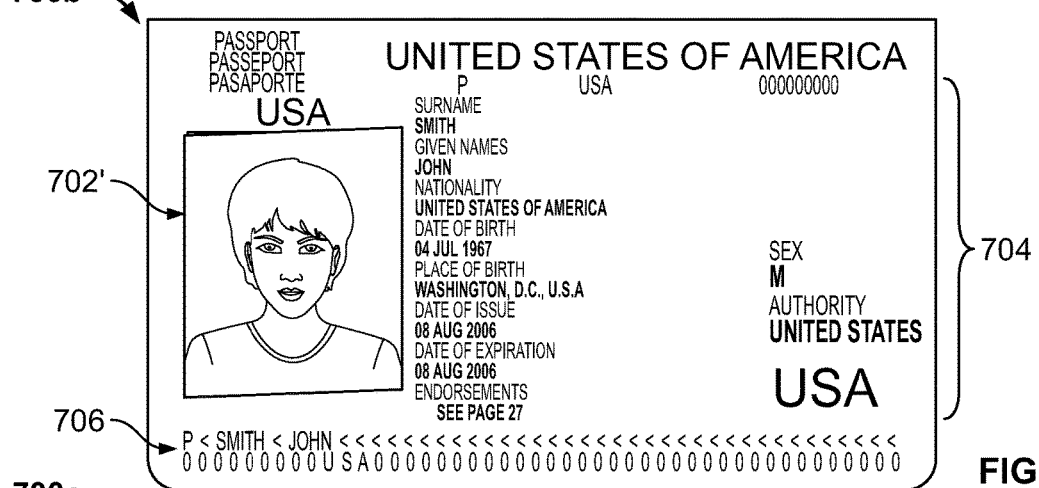
Figure 7C:
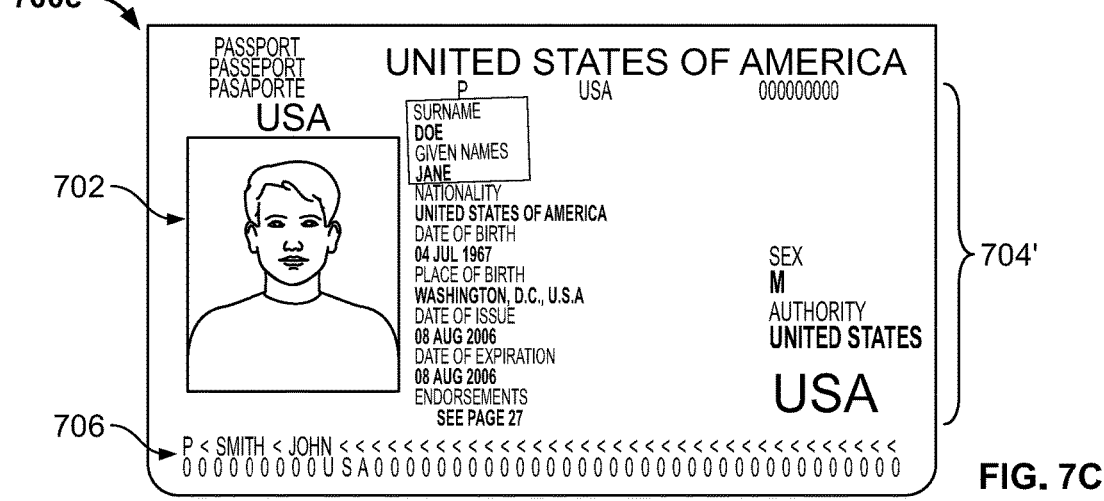
Figure 7D:
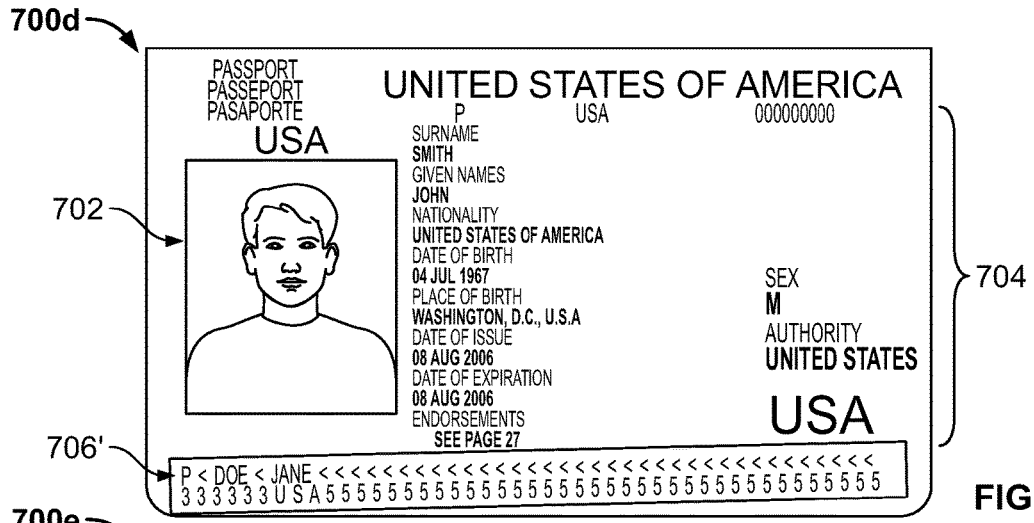
Figure 7E:
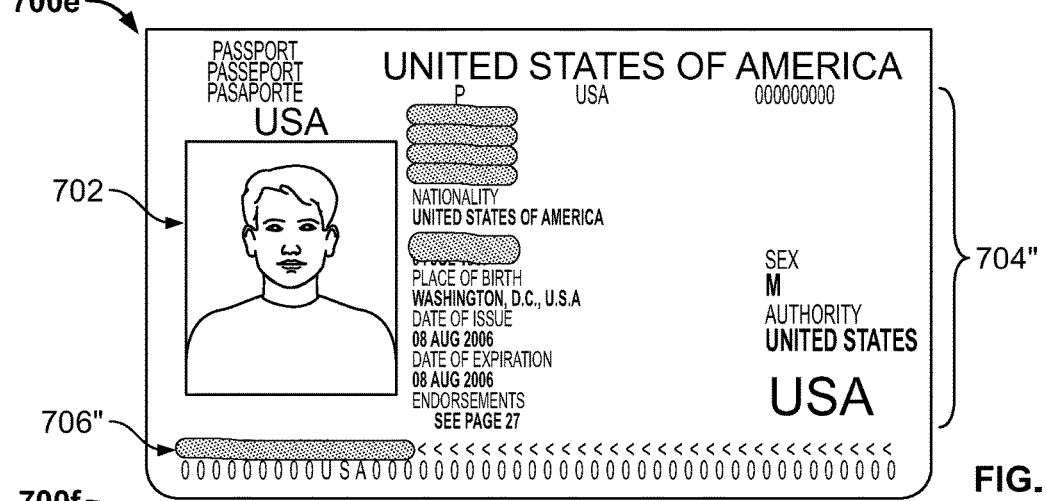
Figure 7F:
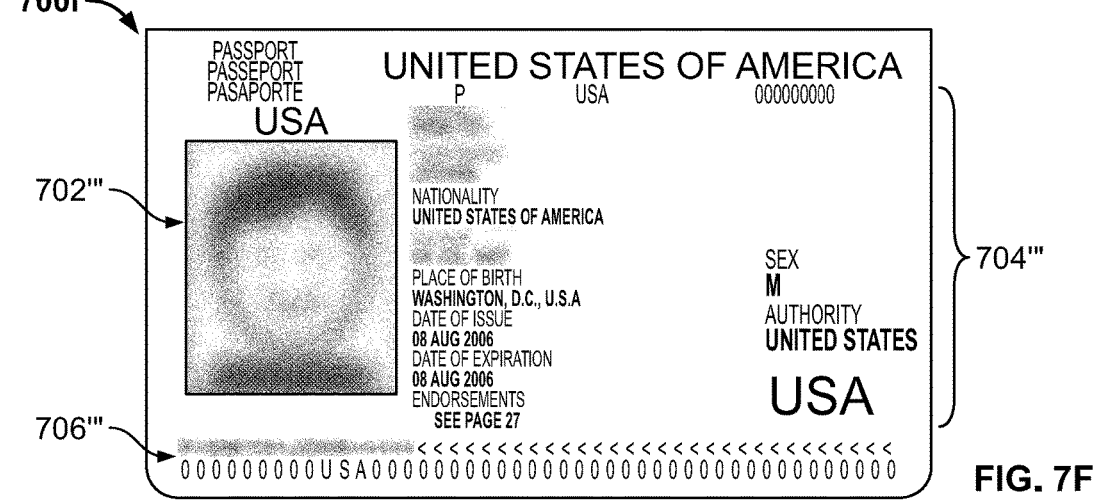

FIG. 4 provides an exemplary process diagram illustrating a training phase for generating an image classifier in accordance with processes 200 and 300 described above. As shown in FIG. 4, the training phase begins by receiving natural or "untampered images." The untampered images are then manually or automatically tampered as discussed below with reference to FIGS. 6A-7F. The tampered and untampered images are labeled as such, and then processed by resizing (if necessary) and augmentation. The augmented training images are then provided to the CNN for generating a trained image classifier. FIG. 5 provides a process diagram illustrating a test phase for evaluating an image classifier (e.g., step 200 of process 200). As shown in FIG. 5, the test phase is implemented by submitting a test image to the system and processing the test image with a trained CNN image classifier. The classifier outputs a tamper probability, which is compared to a predetermined threshold to determine whether a tamper alert is raised. The classification of tampered/untampered is verified, and any mislabeled images are added to the training dataset.

FIGS. 6A-7F represent various examples untampered and tampered imaged identification documents. In particular, digital images 600a and 700a are examples of untampered identification documents including the following high value regions: photos 602,702, biographic data 604,704, and MRZs 606,706. Digital images 600b-f and 700b-f are examples of identification documents where certain high value regions have been tampered. Digital images 600a-f correspond to a state driver's license, and digital images 700a-f correspond to a passport.

As noted above, the tampered digital images 600b-f and 700b-f may be derived from the untampered digital images 600a and 700a. As a first example, tampered digital images 600b and 700b can be generated by replacing the photo 602,702 with a new and different photo 602',702'. As a second example, tampered digital images 600c and 700c can be generated by replacing the original biographic information 604,704 with new and different biographic information 604',704'. As a third example, tampered digital images 600d and 700d can be generated by replacing the original MRZ 606,706 with a new and different MRZ 606',706'. As a fourth example, tampered digital images 600e and 700e can be generated by occluding one or more high value regions of the imaged identification document. In image 600e, for instance, photo 602" and biographic information 604" have been occluded by blacking out portions of those regions. Similarly, in image 700e, biographic information 704" and MRZ 706" have been occluded by black out. Of course, various other types of image occlusion that obstruct visual inspection of a high value region also fall within the scope of the present disclosure. As a fifth example, tampered digital images 600f and 700f can be generated by blurring one or more high value regions of the imaged identification document. In image 600f, biographic information 604''' has been blurred. In image 700f, all three high value regions—photo 702''', biographic information 704''', and MRZ 706''' have been blurred.

In some examples splicing (e.g., replacing a portion of the digital image), occluding, and blurring of photos, biographics, and MRZs can be performed automatically by the system to generate a portion of the training dataset. For instance, the system may utilize a face detector, text detector, or other suitable image-analyzing technologies to identify the high value regions on a particular imaged identification document. The identified region may then be selectively tampered as discussed above. In some examples, only certain portions of the high value regions may be tampered with. For instance, a face detector may be configured to identify certain selective portions of a photo—e.g., the eyes, hair, nose or mouth. As another example, a text detector may be configured to identify certain biographic information—e.g., a driver's license number, a date of birth, or a document discriminator. In some examples, multiple tampered images can be derived from a common untampered image. For example, different techniques for splicing, occluding, and blurring can be used to create different types of tampered images. In some implementations, different splicing techniques can result in softened, hardened, or jagged edges. Different splicing techniques may also involve gradient domain stitching and/or balance adjustments. Similarly, different degrees of blurring and/or occlusions of different size, shape, and color may be used to derive multiple tampered images. Automatically generating several different types of tampered images is advantageous because it increases the size of the training dataset. This advantage is amplified when CNNs are used to facilitate the determination of whether an image corresponds to a tampered identification document, because these types of classifiers continue to improve with increasing training examples. Moreover, the automatically generated tampered images further diversify the training data by mimicking different levels of sophistication in tampering. For example, a rudimentary attempt at splicing may produce jagged edges, while a more sophisticated attempt may produce smooth edges.

Figure 8:
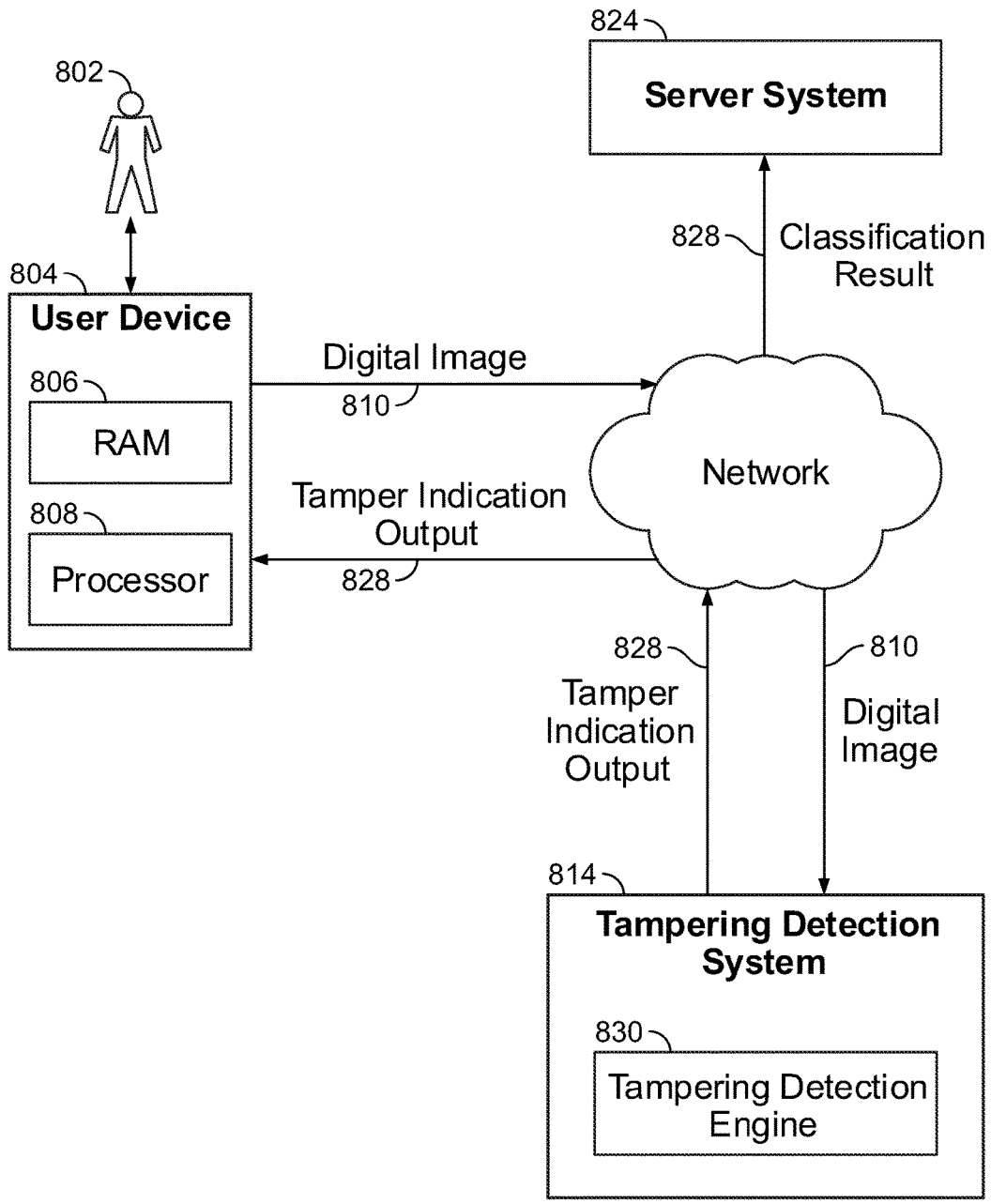

FIG. 8 is a diagram of an example system 800 for providing output indicating whether an imaged identification document has been tampered with. The system 800 can be implemented in an internet, an intranet, or any other suitable wired or wireless client-server environment. The system 800 provides an example architecture in which the systems, components, and techniques described below can be implemented.

As shown, a user 802 can interact with a tampering detection system 814 through a user device 804. For example, the user device 804 may include a computer, a camera, a scanner, a video recorder, or a mobile device, e.g., a mobile phone, or a tablet, coupled to the tampering detection system 814 through a local area network (LAN) or wide area network (WAN), e.g., the Internet. In some implementations, the tampering detection system 814 and the user device 804 can be one machine. For example, the user 802 can install a computer program or an application on the user device 804. The user device 804 generally includes a random access memory (RAM) 806 and a processor 808.

The user 802 can submit a digital image 810 of a physical credential to a tampering detection engine 830 within a tampering detection system 814. In this example, the digital image 810 of the physical credential is transmitted through a network to the tampering detection system 814. The tampering detection system 814 can be implemented as, for example, computer programs running on one or more computers in one or more locations that are coupled to each other through a network.

The tampering detection system 814 includes the tampering detection engine 830. The tampering detection engine 830 includes an image classifier trained using training images of physical credentials. In some implementations, the tampering detection engine 830 can include the image classifier 106 trained by the classifier generator 104 described above with respect to FIG. 1. The tampering detection engine 830 receives the digital image 810 of the physical credential and analyzes the digital image 810 using pixel-level image analysis techniques. The tampering detection engine 830 can perform a pixel-level analysis on the digital image 810 that includes an array of pixels. The tampering detection engine 830 extracts intrinsic pixel features from the digital image 810 and determines whether the digital image 810 is tampered or untampered based on the extracted features. The tampering detection engine 830 generates the tamper indication output 828 based on the determination as to whether the digital image 810 is tampered or untampered.

The tamper indication output 828 generated by the tampering detection system 814 is provided to the user device 804 for presentation to the user 802. In some implementations, the tamper indication output 828 is provided to a server system 824 for use in authenticating the user 802. For example, the server system 824 can be a server system of a financial institution. The server system 824 can use the tamper indication output 828 to authenticate that the user 802 is an owner of a particular account. In addition, the server system 824 can be a server system of an employer. The server system 824 can use the tamper indication output 828 to authenticate that the user 802 is an employee of the employer. Moreover, the server system 824 can be a server system of a hotel. The server system 824 can use the tamper indication output 828 to authenticate that the user 802 is a guest staying at the hotel. Various other types of electronic transactions are also envisioned within the scope of the present disclosure. Note that in many implementations, the tamper indication output may be combined with further processing techniques to ultimately authenticate a user. That is, a tamper indication output of "natural" or "untampered" may inform the system that data included in one or more high value regions of the imaged credential is genuine, and has not been tampered with. With this guarantee, the system may go on to extract and process information from the high value regions to authenticate the user in accordance with conventional authentication techniques and practices.

With respect to FIG. 8, in some implementations, the tampering detection engine 830 can include multiple image classifiers. For example, the tampering detection engine 830 can include a first image classifier that determines whether a digital image of a physical credential is tampered or untampered based on an identification photo area of the digital image. The first image classifier can be trained using the training images described above with respect to FIGS. 6B and 7B. The tampering detection engine 830 can further include a second image classifier that determines whether a digital image of a physical credential is tampered or untampered based on a biographic information area of the digital image. The second image classifier can be trained using the training images described above with respect to FIGS. 6C and 7C. The tampering detection engine 830 can further include a third image classifier that determines whether a digital image of a physical credential is tampered or untampered based on an MRZ in the digital image. The third image classifier can be trained using the training images described above with respect to FIGS. 6D and 7D. The tampering detection engine 830 can further include a fourth image classifier that determines whether a digital image of a physical credential is tampered or untampered based on occlusion or blurring of an identification photo area, a biographic information area, an MRZ, or a biometric information area of the digital image. The fourth image classifier can be trained using the training images described above with respect to FIGS. 6E-F and 7E-F.

In some implementations, the tampering detection engine 830 can apply one or more of the multiple image classifiers in series. The output from multiple classifiers can be applied to one or more thresholds independently or aggregated to produce a combined output. For example, the tampering detection engine 830 can serially apply the first image classifier and the third image classifier to the digital image 810. The tampering detection engine 830 can be configured to generate the tamper indication output 828 as tampered if either the first image classifier or the third image classifier determines that the digital image 810 is tampered. In some implementations, the tampering detection engine 830 can apply various combinations of image classifiers based on a type of a physical credential. That is, different types of credentials/identification documents may have different high value regions that require analysis by different image classifiers. Moreover, in some implementations, the tampering detection engine 830 can apply various combinations of image classifiers based on a determination as to whether a digital image of a physical credential represents a front side or a back side of the physical credential. As a first example, the tampering detection engine 830 may be configured to apply the first, second, third, and fourth image classifiers for an image of the front side of the passport shown in FIGS. 7A-7F because a comprehensive set of high value regions are present. As a second example, the tampering detection engine 830 may be configured to use the first, second, and forth image classifiers for an image of the front side of the driver's license shown in FIGS. 6A-C and 6E-F, which includes an MRZ only on the backside.

Figure 9:
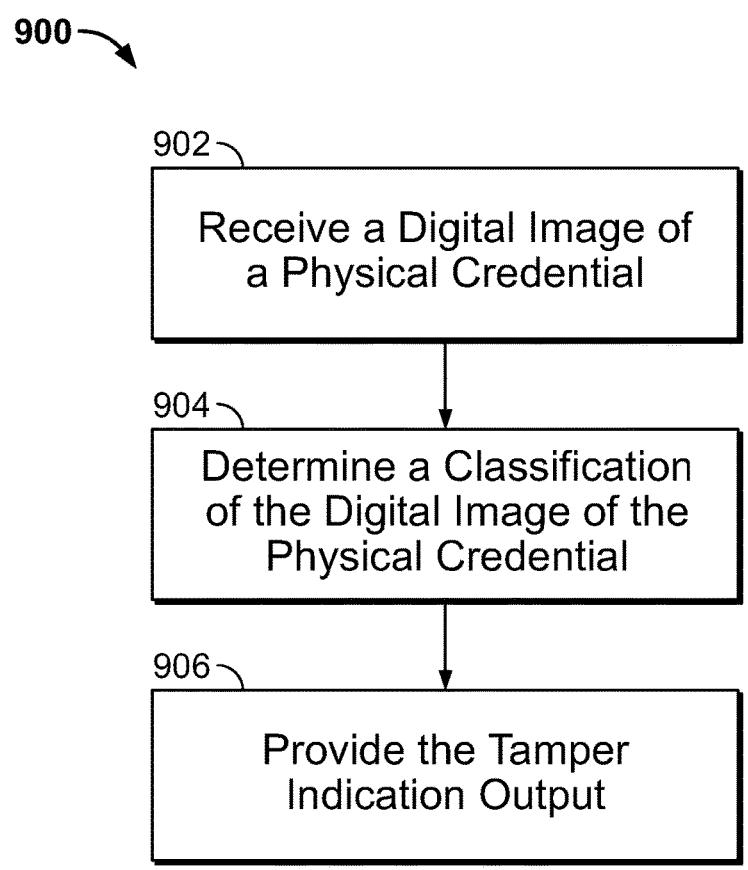

FIG. 9 is a flowchart of an example process 900 for providing output indicating whether an imaged identification document has been tampered with. In some examples, the tampering detection system 830 described with respect to FIG. 8 can perform the process 900. According to the process 900, the system receives a digital image of a physical credential (902). The system receives the digital image of the physical credential from a user device. The system determines whether the received digital image of the physical credential is tampered or untampered (904). The system receives the digital image of the physical credential and analyzes the digital image using image analysis techniques. The system can perform a pixel-level analysis on the digital image that includes an array of pixels. The system extracts intrinsic features from the digital image and determines whether the digital image is tampered or untampered based on the extracted features. The system generates the tamper indication output based on the determination as to whether the digital image is tampered or untampered. The system provides the tamper indication output (906). In some implementations, the tamper indication output generated by the system is provided to the user device for presentation to the user. In some implementations, the tamper indication output is provided to a server system of a third party for authenticating the user.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending digital images to and receiving digital images from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for detecting digital or physical tampering of an imaged physical credential, the method being executed using one or more processors and comprising:
   receiving a digital image representing a physical credential having one or more high value regions, the digital image comprising an array of pixels;
   processing the digital image with a tamper detector to generate an output corresponding to an intrinsic characteristic of the digital image, the tamper detector configured to perform a pixel-level analysis of the high value regions of the digital image with respect to a predetermined tampering signature, the tamper detector comprising a predictive model trained by a machine learning algorithm applying a training dataset, the training dataset comprising:
      a first set of untampered digital images selected to induce examination of a combination of multiple intrinsic pixel features; and
      a second set of digital images including digitally tampered derivations of one or more of the untampered digital images, and
      wherein each of the untampered digital images of the first set are assigned a first common label in the training dataset, and each of the tampered digital images of the second set are assigned a second common label in the training dataset, the second label differing from the first; and
   determining, based on the output from the tamper detector, whether the digital image has been digitally tampered with.

2. The method of claim 1, wherein the pixel-level analysis comprises examination of a combination of multiple intrinsic pixel features comprising:
   one or more pixel features that evidence physical and/or digital tampering; and
   one or more benign pixel features including: environmental, capture device, credential wear, lighting effects, hardware/software quantization, and/or digital compression effects.

3. The method of claim 1, wherein a high value region of the received digital image comprises biographical text, and wherein the predetermined tampering signature of the tamper detector comprises biographics splicing or other modification.

4. The method of claim 1, wherein a high value region of the received digital image comprises biometric data, and wherein the predetermined tampering signature of the tamper detector comprises photo splicing or other modification.

5. The method of claim 1, wherein a high value region of the received digital image comprises a machine readable zone (MRZ), and wherein the predetermined tampering signature of the tamper detector comprises MRZ splicing or other modification.

6. The method of claim 1, wherein the predetermined tampering signature of the tamper detector comprises image blurring or occlusion of one or more of the high value regions.

7. The method of claim 1, wherein the combination of intrinsic pixel features comprises:
   one or more pixel features that evidence physical and/or digital tampering; and one or more benign pixel features including: environmental, capture device, credential wear, lighting effects, hardware/software quantization, and/or digital compression effects.

8. The method of claim 1, wherein the first set of untampered digital images comprises a plurality of images representing different forms of personal identity credentials having at least one of: different densities of security features or different layout designs.

9. The method of claim 1, wherein the first set of untampered digital images comprises at least one of: a plurality of images captured under different lighting conditions, a plurality of images captured with different imaging devices, a series of digital images representing the same physical credential, each digital image of the series oriented at a different degree of rotation, a plurality of randomly rescaled images, or a plurality of images comprising randomly introduced digital noise.

10. The method of claim 1, wherein the second set of digitally tampered images is derived by modifying one or more portions of a pixel array of each untampered image of the first set, the modification determined based on the tampering signature of the tamper detector.

11. The method of claim 1, wherein the second set of tampered images is derived from manually modifying physical credentials with physical tampering methods followed by digitally imaging a physically modified credential, and wherein the second set of physically modified tampered images is further modified at the pixel level with digital editing tools to mask the physical tamper.

12. The method of claim 1, wherein the second set of tampered images is derived from physical credentials with physical use characteristics being visually evident, the visually evident use characteristics including at least one of wear, damage, design flaws, or deliberate physical modification.

13. The method of claim 1, wherein the second set of tampered images is derived from original uncorrected images with lighting, angle to the focal plane, skew, rotation, or blur inherent from an original digital imaging event.

14. The method of claim 1, wherein the second set of tampered images is derived from enhanced corrected images.

15. The method of claim 1, wherein a plurality of digital images of the training dataset comprise a pixel array having a modified principal component.

16. The method of claim 1, wherein the predictive model comprises a probabilistic classifier, and the output comprises a classification of the digital image and a degree of certainty, and wherein determining whether the digital image has been tampered with comprises comparing the degree of certainty to a predetermined threshold value.

17. The method of claim 1, wherein the predictive model comprises a convolutional neural network classifier having a multi-layer node-based architecture, the classifier having an output layer comprising a multi-class data layer.

18. The method of claim 1, wherein analyzing the pixel array comprises:
identifying a region of interest as a subset of the pixel array; and
implementing a tamper detection algorithm with respect to only the identified region of interest tuned and trained for that region of interest.

19. The method of claim 1, wherein analyzing the pixel array comprises:
identifying a region of interest as a subset of the pixel array; and
implementing multiple tamper detectors based on different tampering signatures with respect to the identified region of interest, and
wherein determining whether a digital image has been tampered with comprises applying multiple independent thresholds to respective outputs from the multiple tamper detectors.

20. The method of claim 1, wherein analyzing the pixel array comprises:
identifying multiple regions of interest as subsets of the pixel array; and
implementing a unique combination of one or more different tamper detection algorithms with respect to each of the regions of interest.

21. The method of claim 1, wherein determining whether a digital image has been tampered with comprises:
for each region of interest, applying multiple independent thresholds to respective tamper outputs from the one or more tamper detectors to determine multiple tamper probabilities;
for each region of interest, aggregating the multiple tamper probabilities to determine a region-level tamper probability, and
aggregating the region-level tamper probabilities of the multiple regions to determine a document-level probability of tamper.

22. The method of claim 1, wherein the physical credential represented by the received digital image comprises one or more physically embedded security features, and wherein the tamper detector is further configured to perform the pixel-level analysis agnostic of the security features embedded in the represented physical credential.

23. A non-transitory computer-readable storage medium coupled to one or more processors and having instructions stored thereon which, when executed by the one or more processors, cause the one or more processors to perform operations for detecting digital or physical tampering of an imaged physical credential, the operations comprising:
receiving a digital image representing a physical credential having one or more high value regions, the digital image comprising an array of pixels;
processing the digital image with a tamper detector to generate an output corresponding to an intrinsic characteristic of the digital image, the tamper detector configured to perform a pixel-level analysis of the high value regions of the digital image with respect to a predetermined tampering signature, the tamper detector comprising a predictive model trained by a machine learning algorithm applying a training dataset, the training dataset comprising:
a first set of untampered digital images selected to induce examination of a combination of multiple intrinsic pixel features; and
a second set of digital images including digitally tampered derivations of one or more of the untampered digital images, and
wherein each of the untampered digital images of the first set are assigned a first common label in the training dataset, and each of the tampered digital images of the second set are assigned a second common label in the training dataset, the second label differing from the first; and
determining, based on the output from the tamper detector, whether the digital image has been digitally tampered with.

24. A system, comprising:

a computing device; and a computer-readable storage device coupled to the computing device and having instructions stored thereon which, when executed by the computing device, cause the computing device to perform operations for detecting digital or physical tampering of an imaged physical credential, the operations comprising:

receiving a digital image representing a physical credential having one or more high value regions, the digital image comprising an array of pixels;

processing the digital image with a tamper detector to generate an output corresponding to an intrinsic characteristic of the digital image, the tamper detector configured to perform a pixel-level analysis of the high value regions of the digital image with respect to a predetermined tampering signature, the tamper detector comprising a predictive model trained by a machine learning algorithm applying a training dataset, the training dataset comprising:

a first set of untampered digital images selected to induce examination of a combination of multiple intrinsic pixel features; and a second set of digital images including digitally tampered derivations of one or more of the untampered digital images, and wherein each of the untampered digital images of the first set are assigned a first common label in the training dataset, and each of the tampered digital images of the second set are assigned a second common label in the training dataset, the second label differing from the first; and determining, based on the output from the tamper detector, whether the digital image has been digitally tampered with.

* * * * *